United States Patent
Bues et al.

(10) Patent No.: US 11,451,764 B2
(45) Date of Patent: Sep. 20, 2022

(54) METHOD AND DEVICE FOR THE SIMULTANEOUS PROJECTION OF INDIVIDUAL IMAGES FOR A PLURALITY OF VIEWERS

(71) Applicant: FRAUNHOFER-GESELLSCHAFT ZUR FÖRDERUNG DER ANGEWANDTEN FORSCHUNG E. V., Munich (DE)

(72) Inventors: Matthias Bues, Stuttgart (DE); Benjamin Wingert, Stuttgart (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/307,932

(22) Filed: May 4, 2021

(65) Prior Publication Data
US 2021/0352269 A1 Nov. 11, 2021

(30) Foreign Application Priority Data
May 6, 2020 (EP) .................................. 20173132

(51) Int. Cl.
*H04N 13/363* (2018.01)
*H04N 13/324* (2018.01)
*H04N 13/341* (2018.01)
*H04N 13/354* (2018.01)

(52) U.S. Cl.
CPC ......... *H04N 13/363* (2018.05); *H04N 13/324* (2018.05); *H04N 13/341* (2018.05); *H04N 13/354* (2018.05)

(58) Field of Classification Search
CPC .. H04N 13/363; H04N 13/324; H04N 13/341; H04N 13/354; H04N 2013/40; H04N 2013/405
USPC .......................................................... 348/53
See application file for complete search history.

(56) References Cited

U.S. PATENT DOCUMENTS

| | | | | |
|---|---|---|---|---|
| 6,535,241 B1 * | 3/2003 | McDowall | ........... | H04N 13/189 348/51 |
| 7,190,518 B1 * | 3/2007 | Kleinberger | ......... | H04N 13/373 359/465 |
| 8,066,377 B1 * | 11/2011 | Husak | .................... | H04N 9/312 353/7 |

(Continued)

FOREIGN PATENT DOCUMENTS

WO    WO 2012/028586 A1    3/2012

OTHER PUBLICATIONS

Cruz-Neira et al., "Surround-Screen Projection-Based Virtual Reality: The Design and Implementation of the CAVE," *Proceedings of the 20th Annual Conference on Computer Graphics and Interactive Techniques*, pp. 135-142 (1993).

(Continued)

*Primary Examiner* — Tung T Vo
(74) *Attorney, Agent, or Firm* — Leydig, Voit & Mayer, Ltd.

(57) ABSTRACT

Disclosed are a method and a device by which individual images can be displayed simultaneously to a plurality of observers. In this process, projectors can be used that project the colors from which the images are assembled following one another periodically in time.

15 Claims, 2 Drawing Sheets

(56) References Cited

U.S. PATENT DOCUMENTS

Figure 1:
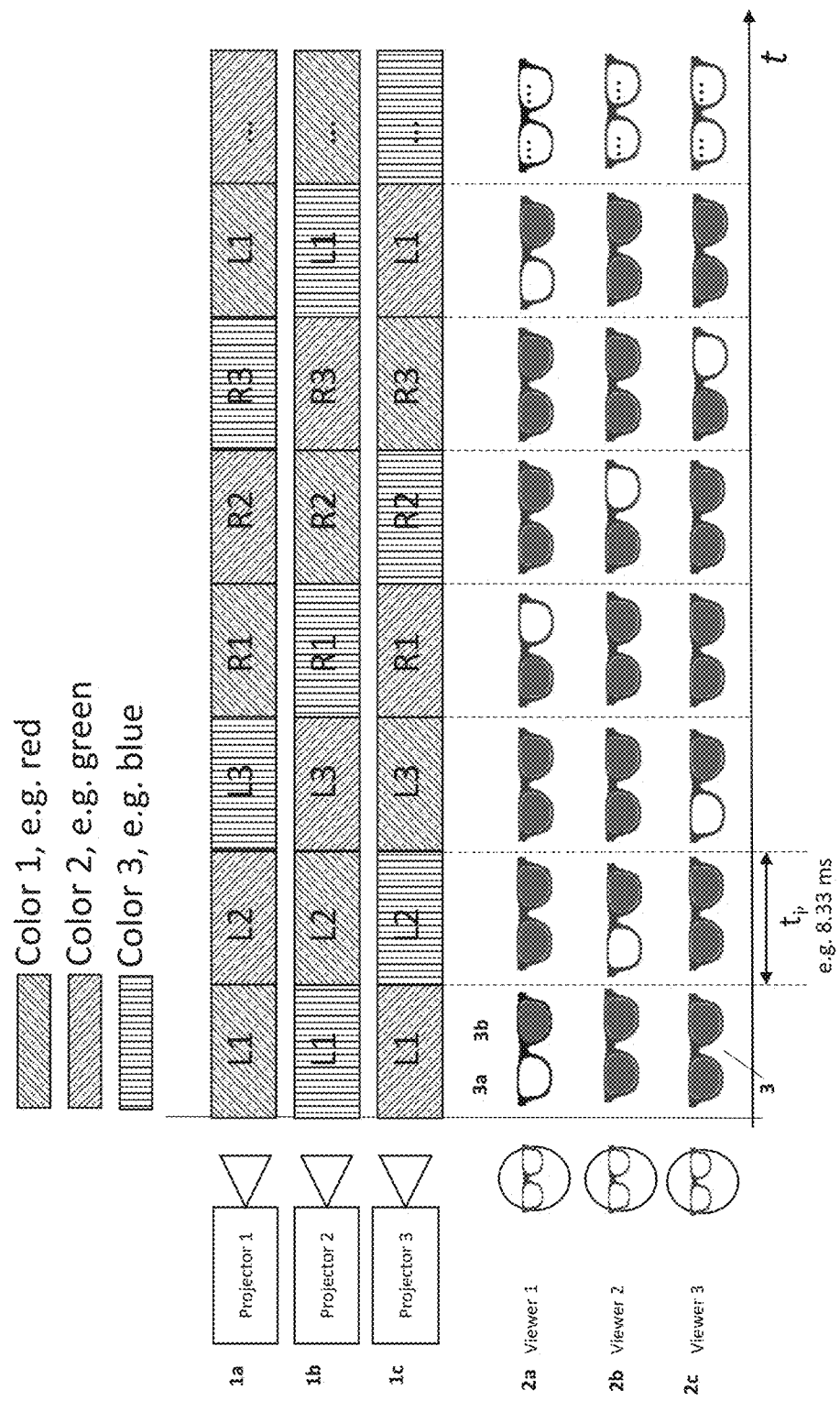

| | | | | |
|---|---|---|---|---|
| 8,556,429 B2* | 10/2013 | Husak | H04N 13/341 | 353/7 |
| 8,922,631 B1* | 12/2014 | Johnston | H04N 13/356 | 348/56 |
| 9,423,602 B1* | 8/2016 | Dolgoff | H04N 13/398 | |
| 9,621,878 B2* | 4/2017 | Husak | H04N 13/339 | |
| 9,751,011 B2* | 9/2017 | Harvey | A63F 13/00 | |
| 10,026,217 B2 | 7/2018 | Zink et al. | | |
| 11,025,892 B1* | 6/2021 | Aman | A63F 13/69 | |
| 2005/0270367 A1* | 12/2005 | McDowall | G02B 30/24 | 348/51 |
| 2007/0127121 A1* | 6/2007 | Maximus | G02B 30/23 | 359/465 |
| 2009/0185030 A1* | 7/2009 | McDowall | H04N 13/15 | 348/53 |
| 2010/0079585 A1* | 4/2010 | Nemeth | H04N 13/363 | 348/54 |
| 2012/0300047 A1* | 11/2012 | Husak | H04N 13/339 | 348/56 |
| 2013/0169637 A1 | 7/2013 | Zink et al. | | |
| 2014/0098203 A1* | 4/2014 | Husak | H04N 9/3114 | 348/56 |
| 2015/0062315 A1* | 3/2015 | Davis | H04N 13/361 | 348/56 |
| 2017/0223345 A1* | 8/2017 | Husak | H04N 9/312 | |
| 2019/0054379 A1* | 2/2019 | Ackley | A63F 13/525 | |

OTHER PUBLICATIONS

Kulik et al., "C1×6: A stereoscopic six-user display for co-located collaboration in shared virtual environments," *ACM Trans. Graph.* 30(6), Article 188, pp. 1-11 (2011).

\* cited by examiner

METHOD AND DEVICE FOR THE SIMULTANEOUS PROJECTION OF INDIVIDUAL IMAGES FOR A PLURALITY OF VIEWERS

CROSS-REFERENCE TO A RELATED APPLICATION

This patent application claims the benefit of European Patent Application No. 20 173 132.0, filed May 6, 2020, the disclosure of which is incorporated herein by reference for all purposes.

BACKGROUND OF THE INVENTION

Stereoscopic projection systems are frequently used for the large-area presentation of three-dimensional information, e.g. of CAD data. In this process, a separate image for the left and right eyes is respectively projected onto the same area and separated again on the viewer side by means of suitable spectacles. This principle is also used in 3D cinemas. A common method is a time-sequential projection in which images for the left and right eyes are projected alternately and are separated again using so-called shutter spectacles. The shutter spectacles respectively only release the image for that eye whose image is just being projected.

If this 3D presentation is combined with a spatial position measurement of the viewer's position (head tracking), a perspectively correct presentation that is to scale can be achieved. This is the basic principle of projection-based virtual environments, e.g. CAVEs. (C. Cruz-Neira, D. J. Sandin, and T. A. DeFanti, "Surround-screen Projection-based Virtual Reality: The Design and Implementation of the CAVE," in Proceedings of the 20th Annual Conference on Computer Graphics and Interactive Techniques, 1993, pp. 135-142). 135-142). In the prior art, however, only a single stereo image pair can be presented so that the spatial representation to scale is only possible for one viewer. This is a serious restriction because a true collaboration of a plurality of persons in one CAVE is thereby not possible.

A solution approach that has already been presented for this problem is to project more than one stereo image pair over one another and to separate them again by correspondingly adapted spectacles such that every viewer sees the stereo image pair associated with him.

In an existing patented method (A. Zink and B. Froehlich "Method for representing a plurality of image sequences", PCT/EP2011/064830, 2011), DLP projectors (DLP=digital light processing, a projection method in which the imaging element is a matrix of micromirrors (DMD=digital micromirror device)) that present the image in color sequences, that is consecutively the red, green and blue channels. At a typical frame rate of 60 Hz, the individual color channels therefore change at a frequency of 180 Hz. The light color is here adapted by a color wheel that rotates synchronously with the image representation and that has a respective one red, green, and blue sector. Since the color wheel is the temporally least flexible component of the system, its frequency of rotation and phase determine the timing of the image presentation.

The existing method uses this high color refresh rate for a temporally sequential representation of the individual images for the viewers that are then separated again by sufficiently fast shutter spectacles. For this purpose, the respective color wheel is removed from three projectors of the same type and its missing clock pulse is generated by an external clock oscillator. The latter controls all three projectors, whereby they are also synchronized with one another. The projectors only present gray scale images due to the removal of the color wheel.

A respective monochrome, red, green, or blue image is produced from this by introduction of a color filter (red, green, or blue) at any desired point in the light path, e.g. in front of the projection lens. The color channels of the three input images are distributed over the respective projectors by a suitable video processor. If projectors are now used that per se already permit a temporally sequential 3D representation, a respective one separate stereo image pair can be generated for three viewers using three projectors. The refresh rate doubles to 360 Hz in this case. In A. Kulik et al., "C1×6: A Stereoscopic Six-user Display for Co-located Collaboration in Shared Virtual Environments", ACM Trans. Graph., vol. 30, no. 6, p. 188:1-188:12, 2011, polarization filters are additionally used for separation that double the number of separable individual images to 12 and thus make six independent viewers possible.

The prime disadvantage of this method, however, is that it requires extensive optical, mechanical, and electrical modifications of the projectors used. It is more serious that these modifications greatly depend in detail on the respective projector type and can even not be performed on some projectors. This in particular relates to the removal of the color wheel for which the projector has to be largely dismantled. In addition, an infrared filter is usually also integrated in the color wheel. This reduces the thermal radiation incident on the DMD and has to be replaced with a suitable infrared filter after the removal of the color wheel. Since the projector as a rule does not have an installation device or this, it has to be respectively designed and produced. In addition, the supply of the external clock signal has to be adapted to the electronics of the respective projector.

BRIEF SUMMARY OF THE INVENTION

It is therefore the object of the present invention to provide a method and a device for the simultaneous projection of individual images for a plurality of viewers in which projectors can be used that periodically project the colors temporally consecutively in a predefined manner such as is the case, for example, with the projectors described above having an installed color wheel. The object is provided for non-stereoscopic and stereoscopic images.

The object is achieved by the method for projecting images for viewing by a plurality M of viewers in accordance with the invention described herein, and by the projection device for projecting images for viewing by a plurality M of viewers in accordance with the invention described herein. Further advantageous developments of the method in accordance with the invention and of the device in accordance with the invention are also described.

BRIEF DESCRIPTION OF THE DRAWING(S)

The invention will be explained by way of example in the following with reference to some Figures. The same reference numerals here designate the same or corresponding features. The features described in the examples can furthermore be implemented independently of the corresponding examples and can be combined among different examples.

Figure 2:
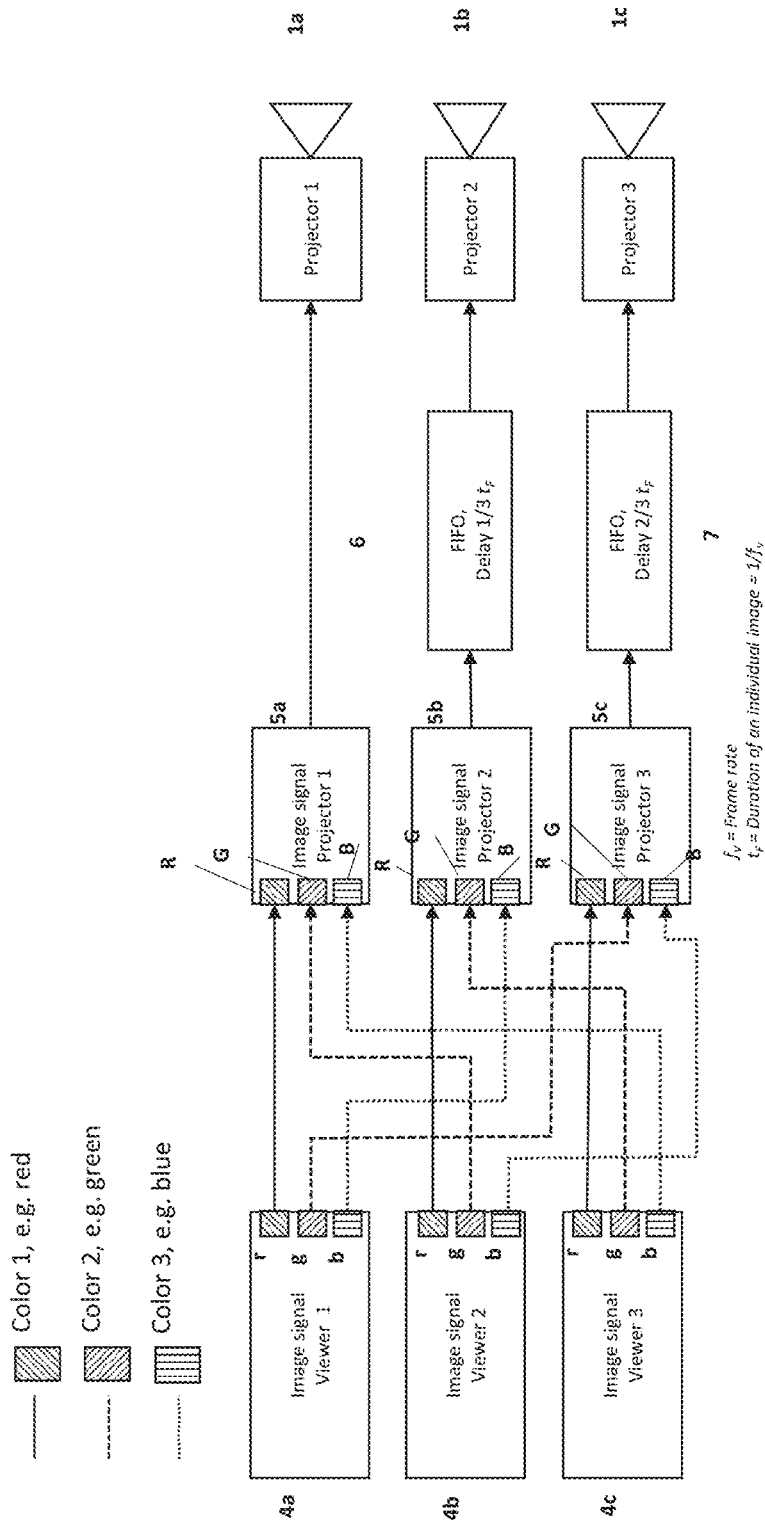

There are shown as follows:

FIG. 1: a time scheme of an embodiment of the method in accordance with the invention; and FIG. 2: a signal path with a resorting of color channels and delay mechanisms.

DETAILED DESCRIPTION OF THE INVENTION

The present invention relates to a method and to a device by which individual images can be displayed simultaneously to a plurality of viewers. In this process, projectors can be used that project the colors from which the images are assembled following one another periodically in time.

In accordance with the invention, a method of projecting images for viewing by a plurality of viewers is provided. The number of viewers will be marked by M in this respect. The term "projection" can here be understood as having the same meaning as "display". Projection is preferably understood as a display method in which a projector irradiates a surface with light to present the image on the surface. The surface is planar in the normal case, but methods are also possible in which surfaces of three-dimensional bodies are irradiated.

The images are preferably, but not necessarily, stereoscopic images. Stereoscopic images are images that respectively have a partial image for a left eye and a right eye of a viewer.

The method in accordance with the invention preferably simultaneously projects a plurality of images that are each associated with a viewer. That is, an individual image is projected for every viewer in each case. If therefore images are to be presented for a plurality M of viewers m, a number of M individual images $B_m$, m=1, ..., M are always presented. The index m should indicate the viewer here.

A simultaneous projection of a plurality of images should here be understood as a projection of the individual images that are simultaneously perceived by the plurality of viewers. A plurality of simultaneously projected images are therefore perceived at the same time by the respective viewers. The simultaneous perception is here determined by the physiology of vision. As will be described further below, the color components of the images or partial images of the different viewers are projected after one another in time and the partial images of different eyes are projected after one another in time in the case of stereoscopic projection. The frequency of the projection is here, however, selected as so high that the color components are perceived as simultaneous even though they are projected temporally consecutively.

The images $B_m$ in the case of stereoscopic images each have a partial image $T_{m\ left}$ for a left eye of the viewer m and a partial image $T_{m\ right}$ for a right eye of the viewer m. These partial images should here be called $T_{m\ a}$, $a \in \{left, right\}$, with the index a indicating the eye of the corresponding viewer m. If the images $B_m$ are not stereoscopic images, the partial images are identical for a given viewer. In this case, the partial images should be designated as $T_{m\ a=both}$. The case of a=both should characterize the non-stereoscopic case in the following. The partial images $T_{m\ both}$ can in this case also be the images $B_m$ themselves. They are called "partial images" here to enable a consistent description of both cases.

Each of the partial images $T_{m\ a}$ is composed of N, $N \in \mathbb{N}$ and $N \geq 2$, color components $F_{m\ a\ c}$, c=1, ..., N of different colors. The number of colors will preferably be N=3 in the normal case. The color components $F_{m\ a\ c}$ are in this case then the components of the partial images $T_{m\ a}$ in these colors. The three colors can, for example, be red, green, and blue. The indices c=1, 2, 3 then correspond to the colors red, green, and blue in any desired, but fixed order.

In accordance with the invention, the number of N projectors $P_n$, n=1, ..., N is used to project the images. The number of projectors N is the same here as the number of color components from which the images are assembled. The projectors each project color components of the partial images in a fixed order in temporally consecutive time intervals $t_i$. The time intervals $t_i$ should here each designate time durations in which a respective one color component of one of the partial images of the images $B_m$ is presented. The length or duration $dt_i$ of a time interval $t_i$ can amount to 8.33 ms, for example. In the case of stereoscopic images, the length of the time intervals $t_i$ is equal to the display duration of an image divided by 2*M*N. In the case of non-stereoscopic images, the length of the time intervals would, for example, be the display duration of an image divided by M*N since the partial images $T_{m\ a}$ can be presented simultaneously for both eyes of the viewer m since they are identical. An image is preferably presented in this case that is viewed by both eyes of the viewer m.

In accordance with the invention, the projectors are configured such that they project the N colors of the color components, that is those colors form which the partial images are respectively assembled, periodically after one another in time in a fixed order. In an advantageous embodiment of the invention, the projectors can for this purpose each have color wheels that are arranged in the optical path of a light source of the corresponding projector. The color wheels can in this respect each have filter segments in the colors of the N color components along their periphery. The color wheels are arranged such that the optical path extends, starting from the light source of the projector, through that region of the color wheel through which the filter segments move on a rotation of the wheel. The filter segments of the different colors are therefore moved into the optical path of the projector after one another by rotating the color wheel.

In accordance with the invention, the projectors are controlled such that all N color components $F_{m\ a\ c}$, c=1, ..., N of a partial image $T_{m\ a}$ are projected for one eye a, in the case of stereoscopic images, or for both eyes, with non-stereoscopic images, of one of the viewers m. The terms point in time $t_i$ and time interval $t_i$ should here be used as synonyms.

In addition, the projectors together project all the partial images $T_{m\ a}$ of both eyes a of all the viewers m once in the course of a period. That time period is considered as a period here in which an image $B_m$ is displayed. The duration of a period is therefore the sum of the time intervals $t_i$ for the presentation of one of the images $B_m$. If all the time intervals $t_i$ have the same duration dt, the duration of a period is therefore preferably 2*M*N*dt in the case of stereoscopic images or M*N*dt in the case of non-stereoscopic images.

The projectors can advantageously be of the same design so that they project the colors of the color components in the same order. Since, however, respectively different colors are to be presented at a given point in time, the projectors preferably project the N colors offset in time from one another.

In accordance with the invention, in the event of stereoscopic images, one filter is assigned to each eye of a viewer m or, in the non-stereoscopic case, one filter or two synchronously connected filters are assigned to both eyes together, with the filters each being switchable between transparent and opaque. If a filter is switched to transparent, light of the colors used for the presentation can pass through the filter. If the filter is switched to opaque, light of the colors used for the presentation cannot pass through the filter.

In accordance with the invention, the respective filter assigned to the eye a of the viewer m is switched to transparent at the time $t_i$ or in the time period $t_i$, at or in which the projectors display the color components $F_{m\ a\ c}$, c=1, . . . , N, of the partial image $T_{m\ a}$. As described, the projectors respectively display all the color components for a partial image for at least one eye of one of the viewers in a given time interval t. That filter of this eye or of these eyes is then actually switched to transparent while all the other filters, that is the filter of the other eye of the same viewer with stereoscopic images, and the filters for both the eyes of all the other viewers are switched to opaque.

In an advantageous embodiment of the invention, a signal source provide a number of partial image signals equal to the number $T_{m\ a}$ that present the partial images $T_{m\ a}$ for both eyes of all the viewers. The number of partial image signals is therefore here equal to 2*M in the case of stereoscopic images and equal to M in the case of non-stereoscopic images. In this embodiment of the invention, the respective N color components of the image signals can be distributed over the N projectors in that all the N color components of this image signal are supplied to different ones of the projectors for each of the partial image signals. It is ensured in this manner that no projector simultaneously receives a plurality of color components of the same partial image signal since each projector can present only one color component of a partial image in a given time interval $t_i$. The partial image signals can, for example, be supplied over two separate inputs (e.g. HDMI) or time sequentially at double the frame rate (e.g. at 120 Hz for a 60 Hz image signal) with two respective temporally consecutive partial images.

The color components $F_m$ a c respectively supplied to the projectors $P_n$ can preferably be delayed by a time period $Z_n$ of $Z_n=dt*(n-1)$, where dt is the temporal length of the time interval $t_i$. It is assumed here that the projectors are advantageously synchronized with one another and that, for example on the use of color wheels, the phase position of the colors, that is, for example, of the red, green, and blue individual images, is synchronized with the input image signal. If therefore a red, a green, and a blue color component reach a projector after one another, its color wheel is synchronized with these input signals such that the red filter is in the optical path when the red signal is supplied, the green filter when the green signal is supplied, and the blue filter when the blue signal is supplied. If the signal sources advantageously provide the partial images $T_{m\ a}$ in a synchronized manner, this means that, in the signals emanating from the signal sources, the red color components of all the partial images are simultaneous, the green color components of all the partial images are simultaneous, and the blue color components of all the partial images are simultaneous, but with the different color components following one another in time. In this case, the color components of the same color are simultaneously available from the image sources, while the projectors, however, simultaneously present the different color components of the same partial image. The described delay then has the effect that the totality of all N projectors project all the color components of a partial image at given point in time $t_i$.

In an advantageous embodiment of the invention, said delay can be achieved in that a respective first-in first-out memory (FIFO memory) is connected upstream, that is a memory that outputs the read data in the order of entry, but delayed by a certain amount of time. In this embodiment of the invention, the FIFO memory connected upstream of the projector $P_n$ can therefore advantageously buffer n-1 time intervals that delay the supply of the signal from the signal source to the projector by (n-1)*dt. A delay of 0 results for the projector $P_1$ so that no FIFO memory has to be connected upstream of the projector.

The number of color components is preferably N=3 since this is the case in most applications. Most projectors are configured to project the colors red, green, and blue so that the invention is preferably designed with the colors red, green, and blue. In this case, image signals of the colors red, green, and blue are therefore processed. The invention can particularly advantageously be used when the number of viewers is M=3 since then the presentation of the color components of the different partial images for every projector has a period duration of 2 MN and starts from the beginning in the same manner after the elapse of a period. With more or fewer than three viewers, a shift results between the presentation of the color components for the individual eyes of the viewers, which is, however, likewise possible.

If the advantageous case of stereoscopic images with three color components and three viewers is assumed, the image signals in one period can respectively particularly advantageously be projected as follows:

Projector 1: $L_{11}$, $L_{22}$, $L_{33}$, $R_{11}$, $R_{22}$, $R_{33}$, . . .
Projector 2: $L_{12}$, $L_{23}$, $L_{31}$, $R_{12}$, $R_{23}$, $R_{31}$,
Projector 3: $L_{13}$, $L_{21}$, $L_{32}$, $R_{13}$, $R_{21}$, $R_{32}$, . . .

$L_{mc}$ stands for the color component c for the left eye of the viewer m and $R_{mc}$ for the color component c for the right eye of the viewer m.

M<=N is generally preferable. The image signals are preferably also present for N>3 in N individual color components, with then the projectors therefore being able to process an input signal having N color components. Under this condition, the above scheme can be simply generalized by insertion of one row per additional color component and one column in every period, e.g. for N=4:

Projector 1: $L_{11}$, $L_{22}$, $L_{33}$, $L_{44}$, $R_{11}$, $R_{22}$, $R_{33}$, $R_{44}$, . . .
Projector 2: $L_{12}$, $L_{23}$, $L_{34}$, $L_{41}$, $R_{12}$, $R_{23}$, $R_{34}$, $R_{41}$, . . .
Projector 3: $L_{13}$, $L_{24}$, $L_{31}$, $L_{42}$, $R_{13}$, $R_{24}$, $R_{31}$, $R_{42}$, . . .
Projector 4: $L_{14}$, $L_{21}$, $L_{32}$, $L_{43}$, $R_{14}$, $R_{21}$, $R_{32}$, $R_{43}$, . . . .

Either all the filters would be closed for two viewers during the respective third time interval or it would repeat the image of one of the two viewers. The latter case would enable a doubling of the perceived image brightness for a viewer.

More than three viewers require the same number of color components. The generalization then appears as follows (M=number of viewers, N=number of color channels, P=projector). Only the left eye L is shown here; the scheme repeats accordingly for the right eye R:

$P1: L11, L22, \ldots, LMN, R \ldots$ $P2: L12, L23, \ldots, LM(1), R \ldots$ $P3: L13, L24, \ldots, LM(2), R \ldots$

...

$PM: L1N, L2(1), \ldots, LM(N-1), R \ldots$

The same color components of the images $B_m$ for different eyes of the same viewer m are advantageously supplied to the same one of the projectors. The same distribution of the color components over the projectors results for both eyes in this manner.

The described filters can advantageously be designed as spectacles so that a respective filter for a right eye and a filter for a left eye of the same viewer are designed as spectacles. This embodiment enables a comfortable viewing of the projected images. On the projection of non-stereoscopic images, the two filters of a pair of spectacles can each advantageously be synchronized.

As described, the projectors can advantageously project the color components in the same order. The projectors particularly preferably each have a color wheel for this purpose that rotates in the optical path of a light source of the corresponding projector and has filter segments in the N color components along its periphery. The filter segments are arranged here such that they are periodically moved after one another through the optical path from the light source to the projection surface on a rotation of the color wheel. The projector generates images of the different colors after one another in this manner.

All the projectors are preferably synchronized with one another so that they each simultaneously project the different color components. The time periods $t_i$ are therefore simultaneous for all the projectors. The same colors of the different projectors are, however, preferably offset pairwise from one another so that two projectors do not project the same color at any time.

The described images $B_m$ are advantageously frames of a moving image or of a film having M components for the M viewers. Every viewer can therefore see a different film. A film or a moving image should here also be understood as those image sequences that are generated digitally, for example by computer programs that present data in a moving manner.

In accordance with the invention, a display device for the simultaneous projection of individual images, preferably stereoscopic images, for viewing by a plurality M of viewers is also provided. The display device here has N projectors, with N being the number of color components of the images to be projected. The display device additionally has 2M filters that can each be switched between transparent and opaque. In accordance with the invention, this display device is configured to perform a method configured as described above. The display device preferably has a processor such as a CPU that controls the method steps of the above-described methods. What was written on the method applies analogously to the display device.

FIG. 1 shows a time scheme of an example of the method in accordance with the invention in which stereoscopic images are presented. The method is here designed with three projectors 1a, 1b, 1c and with three viewers 2a, 2b, 2c. The time progression is entered in the horizontal direction. The rows next to the projectors 1a, 1b, 1c show the time sequence of the color components that the projector of the corresponding row projects. The rows next to the viewers 2a, 2b, 2c show the state of filters in front of the eyes of the viewers 2a, 2b, 2c, with here two respective filters 3a, 3b for the two eyes of a viewer being connected to form spectacles 3. If a filter 3a is shown in white, this means that it is transparent for light. If a filter 3b is shown in black, it is opaque for light at this point in time.

The method is easily transferable to the case of non-stereoscopic images, with then respective partial images being presented for both eyes of a given viewer instead of left and right partial images.

The columns of FIG. 1 reach represent a time interval $t_i$ in which the projectors project a specific color component and the filters 3a, 3b of the spectacles 3 have a specific transparency state (transparent or opaque). The entries in the fields of the upper three rows consecutively describe the eye (L for left and R for right)j, then the viewer (1, 2, or 3), and the color of the color component (r for red, g for green, and b for blue).

The basic principle is here based on the fact that the projectors 1a, 1b, 1c are synchronized with one another such that the temporally sequential presentation of the individual red, green, and blue images takes place respectively offset by one color. A respective projector 1a, 1b, 1c thereby shows one red, one green, or one blue individual image at each point in time. In the example shown, the color components for the left eye of the first viewer 2a are shown in the first time interval $t_1$, the color components for the left eye of the second viewer 2b in the second time interval $t_2$, and the color components for the left eye of the third viewer 2c in the third time interval $t_3$. The color component for the right eye of the first viewer 2a follows in the fourth time interval $t_4$, then the color component for the right eye of the second viewer 2b, and then the color component for the right eye of the third viewer 2c.

The filters 3a, 3b of the spectacles 3 are controlled synchronously with said time intervals such that the respective filter 3a, 3b in front of the eye of the corresponding viewer is transparent; that is in the first time interval $t_1$ the filter 3a in front of the left eye of the first viewer 2a, in the second time interval $t_2$ the filter in front of the left eye of the second viewer 2b, in the third time interval $t_3$ the filter in front of the left eye of the third viewer 2c, in the fourth time interval $t_4$ the filter in front of the right eye of the first viewer 2a, in the fifth time interval $t_5$ the filter in front of the right eye of the second viewer 2b, and in the sixth time interval $t_6$ the filter in front of the right eye of the third viewer 2c. In the following time intervals, the order of the presentation of the colors and the switching transparent of the filters 3a, 3b is repeated. The temporal arrangement of the columns can also be swapped over.

A number of projectors synchronize their color wheels and thus the phase position of the red, green, and blue individual images with the input image signal. The offset by one color channel can thus be achieved solely by the supply of respective image signals offset in time. An exemplary possibility for producing this time offset from previously synchronous image signals is shown in FIG. 2.

The image signals supplied to the two projectors 1b and 1c are here each buffered in a first-in first-out memory (FIFO memory or queue) whose length corresponds to a third or two thirds of an individual image. FIG. 2 shows the following in detail.

An image signal 4a, 4b, 4c that each have three color components r, g, b are presented for each viewer. The image signals 4a, 4b, 4c are supplied to inputs 5a, 5b, 5c of the projectors 1a, 1b, 1c. It must be pointed out that here the inputs 5a, 5b, 5c can be devices that are independent of the projectors, but are connected thereto, and that can, for example, be connected upstream of commercial projectors 1a, 1b, 1c.

The inputs 5a, 5b, 5c each have inputs R, G, B for the different color components. The color components r, g, b of the image signals 4a, 4b, 4c are respectively distributed over the inputs R, G, B of the projectors 1a, 1b, 1c such that all the color components of the image signals 4a, 4b, 4c are each distributed over different inputs of the projectors 5a, 5b, 5c. The red color component r of the signal 4a is, for example, distributed over the red input R of the input 5a of the projector 1a. The green component g of the image signal 4a is distributed over the input G of the input 5c of the projector 1c and the blue component b of the signal 4a is distributed over the input B of the input 5*b* of the projector 1*b*. The color signals 4*b* and 4*c* are distributed accordingly.

The color components R, G, B are output after one another, that is in sequential time intervals $t_i$, from the respective input 5*a*, 5*b*, and 5*c*. The signals emanating from the input 5*a* are supplied directly to the projector 1*a*. The color signals output by the input 5*b* are supplied to the projector 1*b* via interposition of a FIFO memory 6 that delays the signals by a length dt of the time intervals $t_i$ that is a third of the duration of a partial image. The color components that are presented by the projector 1*b* are therefore shifted by a time interval $t_i$ with respect to those presented by the projector 1*a*.

The color signals output by the input 5*c* are delayed by two time intervals dt, that is by two thirds of the duration of an individual image, by a buffer FIFO 7. The projector 1*c* thereby presents the color components with a delay of two time intervals dt with respect to the projector 1*a*. The scheme shown in FIG. 1 results in this manner.

The time offset can alternatively also take place by external, time-offset synchronization of the projectors via the color wheel clock signal. An electrical modification of the projectors is, however, required for this purpose.

The described method can also be used for other projection technologies than DLP provided they are based on a color-sequential process. Such projection technologies are e.g. single chip LCOS projectors.

The invention can be used in application cases of projection-based virtual environments. It makes possible for the first time therein real collaborative working, for example in engineering, but also in other application domains. A large number of further application cases are furthermore possible, also those that do not require any stereoscopy; for example the simultaneous presentation of different films on the same projection screen.

The invention claimed is:

1. A method for the simultaneous projection of individual images for a plurality M of viewers,
   wherein each image $B_m$, m=1, M, is respectively either a partial image $T_m$ a, a $\epsilon$ {left, right} for a right eye and a left eye of the viewer m for a viewer m or is
   a partial image $T_{m\ a=both}$ for both eyes of a viewer m;
   wherein each partial image $T_m$ a is assembled from N, N$\epsilon$ N and N≥2, color components $F_{m\ a\ c}$, c=1, ..., N of different colors;
   wherein N projectors $P_n$, n=1, ..., N, in each case project color components of the part images in temporally consecutive time intervals $t_i$;
   wherein each projector projects all N colors of color components periodically temporally in a fixed order after one another;
   wherein the N projectors together project all color components $F_{m\ a\ c}$, c=1, ..., N, of a partial image $T_{m\ a}$ for one or both eyes a of one of the viewers m in every time interval $t_i$;
   and project all the partial images $T_{m\ a}$ of both eyes a of all the viewers m once in the course of a period;
   wherein a filter that can be switched between transparent and opaque is assigned to each eye a, a $\epsilon$ (left, right, both) of each viewer; and
   wherein the respective filter assigned to the eye a of the viewer m is switched to transparent in the time interval $t_i$ in which the projectors display the color components of the partial image $T_{m\ a}$.

2. The method in accordance with claim 1, wherein all the projectors project the N colors of the components in the same order, but offset in time from one another.

3. The method in accordance with claim 1,
   wherein a number of partial image signals equal to the number $T_{m\ a}$ that represent the partial images $T_{m\ a}$ are provided by a signal source, and
   wherein the respective N color components of the partial image signals are distributed over the N projectors in that the N color components of this image signal are supplied to different ones of the projectors for each of the partial image signals.

4. The method in accordance with claim 1,
   wherein the method is a method for the simultaneous projection of individual stereoscopic images for the plurality of viewers,
   wherein each image $B_m$, m=1, ..., M, for one of the viewers m is respectively either a partial image $T_m$ a, a $\epsilon$ {left, right} for a right eye and a left eye of the viewer m;
   wherein the N projectors together project all color components $F_{m\ a\ c}$, c=1, ..., N, of a partial image $T_{m\ a}$ for exactly one eye a of one of the viewers m in every time period $t_i$;
   and project all the partial images $T_{m\ a}$ of both eyes a of all the viewers m once in the course of a period;
   wherein a filter that can be switched between transparent and opaque is assigned to each eye a, a $\epsilon$ {left, right, both} of each viewer; and
   wherein the respective filter assigned to the eye a of the viewer m is switched to transparent in the time interval $t_i$ in which the projectors display the color components of the partial image $T_{m\ a}$.

5. The method in accordance with claim 4, wherein the delay of the color components supplied to the projector $P_n$ is effected in that the color components supplied to the projector $P_n$ are led through a first-in first-out memory in which n-1 time intervals are buffered.

6. The method in accordance with claim 1,
   wherein the number of color components is N=3 and/or the number of viewers is M=3.

7. The method in accordance with claim 1, wherein the number of the color components is N=3 and the number of the viewers is M=3 and the image signals are projected to the projectors as follows:
   Projector 1: $L_{11}$, $L_{22}$, $L_{33}$, $R_{11}$, $R_{22}$, $R_{33}$, ...
   Projector 2: $L_{12}$, $L_{23}$, $L_{31}$, $R_{12}$, $R_{23}$, $R_{31}$,
   Projector 3: $L_{13}$, $L_{21}$, $L_{32}$, $R_{13}$, $R_{21}$, $R_{32}$, ...
   where $L_{mc}$ stands for the color component $F_{m\ left\ c}$ for the left eye of the viewer m and $R_{mc}$ for the color component $F_{m\ right\ c}$ for the right eye of the viewer m.

8. The method in accordance with claim 1, wherein color components of the images for different eyes of the same viewer are supplied to the same one of the projectors.

9. The method in accordance with claim 1, wherein a respective filter for a right eye and a filter for a left eye of the same viewer are designed as spectacles.

10. The method in accordance with claim 1, wherein all projectors project the color components in the same order.

11. The method in accordance with claim 10, wherein each of the projectors has a color wheel that rotates in the optical path of a light source of the corresponding projector and has filter segments in the N color components along its periphery.

12. The method in accordance with claim 1, wherein all projectors are synchronized with one another so that each simultaneously projects a color component and projects the same colors pairwise offset by a time interval.

13. The method in accordance with claim 1,
wherein the images $B_m$ are frames of a moving image or of a film having M components for the M viewers.

14. A display device for the simultaneous projection of individual stereoscopic images for viewing by a plurality M of viewers, comprising
  N projectors, where N is the number of color components of the images to be projected;
  2M filters that can each be switched between transparent and opaque,
  wherein the display device is configured to perform a method in accordance with claim 1.

15. A display device in accordance with claim 13, comprising a processor with which the method steps can be performed.

* * * * *